(12) United States Patent
Curry et al.

(10) Patent No.: US 7,342,696 B2
(45) Date of Patent: Mar. 11, 2008

(54) COMPUTATIONAL MOIRÉ COMPENSATION (75) Inventors: Douglas Curry, Palo Alto, CA (US);
David Goldberg, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 924 days.

(21) Appl. No.: 10/646,803

(22) Filed: Aug. 25, 2003

(65) Prior Publication Data
US 2005/0046904 A1    Mar. 3, 2005

(51) Int. Cl.
*H04N 1/46* (2006.01)
*G06K 9/38* (2006.01)

(52) U.S. Cl. .................... 358/533; 358/3.06; 358/3.04; 358/3.2; 358/3.26; 358/1.9; 358/406; 358/528; 358/466; 358/451; 358/448; 358/3.07; 382/270; 382/271; 382/298; 382/266; 382/263

(58) Field of Classification Search .............. 358/3.06, 358/533, 406, 3.2, 3.26, 3.04, 3.16, 1.9, 528, 358/466, 451, 448, 3.07; 356/605; 382/271, 382/266, 263
See application file for complete search history.

(56) References Cited

U.S. PATENT DOCUMENTS

| | | | |
|---|---|---|---|
| 4,760,460 A * | 7/1988 | Shimotohno | 358/426.01 |
| 4,893,195 A * | 1/1990 | Tada et al. | 358/3.26 |
| 4,916,545 A * | 4/1990 | Granger | 358/3.26 |
| 5,410,414 A | 4/1995 | Curry | |
| 5,937,109 A | 8/1999 | Curry | |
| 5,995,638 A * | 11/1999 | Amidror et al. | 382/100 |
| 6,449,346 B1 | 9/2002 | Katz | |
| 6,522,425 B2 * | 2/2003 | Yoshidome | 358/1.9 |

* cited by examiner

Primary Examiner—King Y. Poon
Assistant Examiner—S. Kau
(74) Attorney, Agent, or Firm—Oliff & Berridge, PLC (57) ABSTRACT

The amount of moiré in halftone printed images is reduced using unique moiré intensity functions and moiré vectors in a halftoner. In various embodiments, moiré phase angle zones are determined over the full field of an image and high addressability units in the full-field moiré phase angle zones of the image are adjusted, including in an iterative manner, until they significantly reduce the moiré. A useful relationship between halftoner memory locations and moiré phase angle zones in a full field image is determined. The moiré that occurs in a halftone image is quantified and moiré compensation values obtained are then used to generate an inverse moire amount which is used to compensate for the moiré.

26 Claims, 10 Drawing Sheets

COMPUTATIONAL MOIRÉ COMPENSATION

BACKGROUND OF THE INVENTION

1. Field of Invention

This invention relates to halftones and hyperacuity printers.

2. Background of the Invention

High quality printing depends on many factors, including how much fidelity information can be passed to the printer from a data source or image generator. One purpose of printer electronics is to use image processing to convert high fidelity, sampled image data into a high-band width, high-resolution bit stream for delivery to a printer. Because many printers are binary, image processing operations such as halftoning and thresholding are sometimes used. The printer electronics can use these halftoning and thresholding algorithms to convert a rasterized image of grayscale pixels into a rasterized bitstream of high addressability binary on-off signals for a laser, for instance. These halftoning or thresholding algorithms can be complex mathematical algorithms, implemented with real time math processing, or computed in advance and stored in lookup tables for fast access.

A resampling interpolator is typically found in the electronic pathway between the image generator and the output of the printer. The resampling interpolator is customarily used to provide resolution conversion, but can also be used to electronically compensate for spatial misalignment of the printer. The latter is called electronic registration, and requires fractional positioning of the data sample between rows and columns of pixels in the image as the relative position of the scanning light beam is continuously monitored with respect to the image data. To obtain a resample, the current position of the light beam is measured in units of addressability in both an x (fastscan) direction and a y (slow scan or process) direction.

To implement electronic registration fully, even the halftoning process must be resampled at fractional intervals with respect the halftone dot grid. This is a problem because the halftone structure is typically restricted to integer grid positions to minimize moiré. Moiré is an error in intensity caused by uncompensated overlapping of the halftone grids with themselves or the output grid structure. In order to resample a halftone on a fractional grid, a special type of halftoner called an "irrational halftoner" can be used, where off-grid resamples are allowed. Unfortunately, irrational halftoning can cause an increase in undesirable moiré.

Irrational halftoners are also used to make better halftone screen systems, such as for a full color screen system. These screen systems, such as those that can produce classic "rosette" halftone structures, require the resampling of the halftone grid on fractional intervals because the halftone angle or frequency may be irrational with respect to the scanning grid. For instance, to produce a halftone angle of 30 degrees, a resampling grid slope involving the square root of three is unavoidable. Once again, this need for irrational halftoning for classic "rosette" halftoning structures causes an increase in undesirable moiré. Reference is made to U.S. Pat. No. 5,410,414, "Halftoning In A Hyperacuity Printer", which is incorporated herein by reference in its entirety, for a full teaching of an irrational halftoner that is compatible with the moiré cancellation extension provided by the invention herein.

SUMMARY OF THE INVENTION

Conventionally, attempts to minimize or eliminate moiré include treating the cause of moiré, such as, for example, by using a sampling period that is an exact multiple of a halftone cell, or by modifying screen angles and/or line spacings of the halftone dot functions, or treating the effects of moiré such as, for example, by using error feedback methods to compensate for the quantization error introduced by thresholding. However, none of these methods quantifies the moiré or determines a value that more or less cancels out the moiré.

The applicants have determined that it is possible to correlate the position of moiré intensity errors in a simulated print with the actual memory locations used to produce the errors in the irrational halftoner. The moiré in the simulated print can be measured, and, by iteration, the corresponding intensities in the halftoner memory locations can be raised or lowered to reduce and/or cancel the overall moiré. During this process, a moiré profile is produced that records the final compensation.

This invention provides systems and methods that determine one or more parameters that define the moiré between a halftone screen and an output grid structure.

This invention separately provides systems and methods that determine moiré phase angle zones over the full field of an image.

This invention separately provides systems and methods that create folded-field moiré phase angle zones of the irrational halftoner memory.

This invention separately provide systems and methods that determine and set forth a useful relationship between halftoner memory locations and moiré phase angle zones in a full field image.

This invention separately provides systems and methods for quantifying the moiré that occurs in a halftone image.

This invention further provides systems and methods for determining a value of the moiré compensation amplitude value that obtains a lower observable moiré for a given expected moiré amplitude when combined with the image data to be halftoned.

This invention separately provides systems and methods that digitally halftone image data using halftone data that incorporates moiré compensation data.

This invention separately provides systems and methods that convert continuous tone image data to halftone image data using a look-up table that stores moiré-compensation-adjusted halftone dots.

This invention separately provides systems and methods that convert continuous tone image data to halftone image data using a halftone function that incorporates a moiré compensation portion.

Various exemplary embodiments of the systems and methods according to this invention reduce, and, to the extent possible, minimize or controllably eliminate, moire that is caused by irrational halftone dots. In various exemplary embodiments of the systems and methods of this invention, the frequency and angle of the moiré is determined. In various exemplary embodiments of the systems and methods of this invention, a halftoner, such as, for example, a hyperacuity halftoner, look-up table (LUT) is used. This look-up table has a two-dimensional (a, b) coordinate system that defines a halftone threshold function. In various exemplary embodiments of the systems and methods of this invention, a relationship between the frequency and angle of the moire and the (a, b) coordinates used to address the look-up table is determined. As the halftoning system advances a raster spot within the (a, b) coordinate system, even at an irrational angle, the corresponding amplitude of the moiré is determined as a function of the (a, b) coordinates of the raster spot. In various exemplary embodiments of the systems and methods of this invention, the values determined for the moiré amplitude are used to cancel the known moiré.

The systems and methods of this invention generates computed moiré amplitude within a two-dimensional halftone coordinate system to cancel the naturally occurring moiré. In various exemplary embodiments, the moiré-compensating halftone dots are pre-computed and stored within a halftoner, such as, for example, a hyperacuity halftoner. In various other exemplary embodiments, the moiré canceling halftone dots are determined in real time. This allows higher accuracy to be achieved.

The production of exact irrational halftones according to the systems and methods of this invention allows a standard "rosette" halftone structure in a three-color image to be obtained. Additionally, the irrational halftoning involved according to the systems and methods of this invention allows warping halftone images for electronic registration.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein.

DETAILED DESCRIPTION OF EXEMPLARY EMBODIMENTS

When creating images using halftoning, halftone screens involving irrational screen angles and frequencies are often used. For example, a set of three screens at 141 dots per inch and rotated exactly 30 degrees apart are irrational. These screens are only approximated with traditional rational halftoning techniques, which degrade halftone dot angles desired in offset lithography. Unfortunately, when attempting to obtain exact halftone angles using irrational techniques, halftone dots are forced to land on fractional positions in the scanning grid, producing undesired moiré. This moiré is caused by the inability of halftone construction techniques to take into account quantization errors inevitable from the fractional overlap.

In one exemplary embodiment of the systems and methods of this invention, the moiré reduction systems and methods according to this invention are applied to a high addressability image system, such as, for example, that disclosed in U.S. Pat. No. 6,449,346, incorporated herein by reference in its entirety. As pointed out in the 346 patent, high addressability refers to an imaging method where the imaging device can position the writing spot with precision finer than the size of the writing spot. For instance, a typical 600 spot per inch (spi) high addressability system may operate with a 40 micron writing spot ($\frac{1}{600}^{th}$ of an inch), an addressability of 600/inch in the direction perpendicular to the raster lines, and an addressability of 4800/inch in the direction of the raster lines. Systems that write high addressability images typically regulate a laser or similar writing device using clock modulation, amplitude modulation, pulse width modulation, pulse position modulation or equivalent procedures.

Moreover, an image may be considered to be a high addressability image if one or more pixels within the image have a high addressability format. A high addressability formatted pixel (i.e., a high addressability pixel) is a pixel comprising one or more high addressability pixel events or units, where each high addressability pixel event corresponds to a specific spatial placement of the writing spot with respect to the pixel and has a value that represents a property of the writing spot at that specific spatial placement. In a binary high addressability pixel, for example, each high addressability pixel event is a single bit indicating whether the writing spot is "on" or "off" at the corresponding spatial placement.

Figure 1:
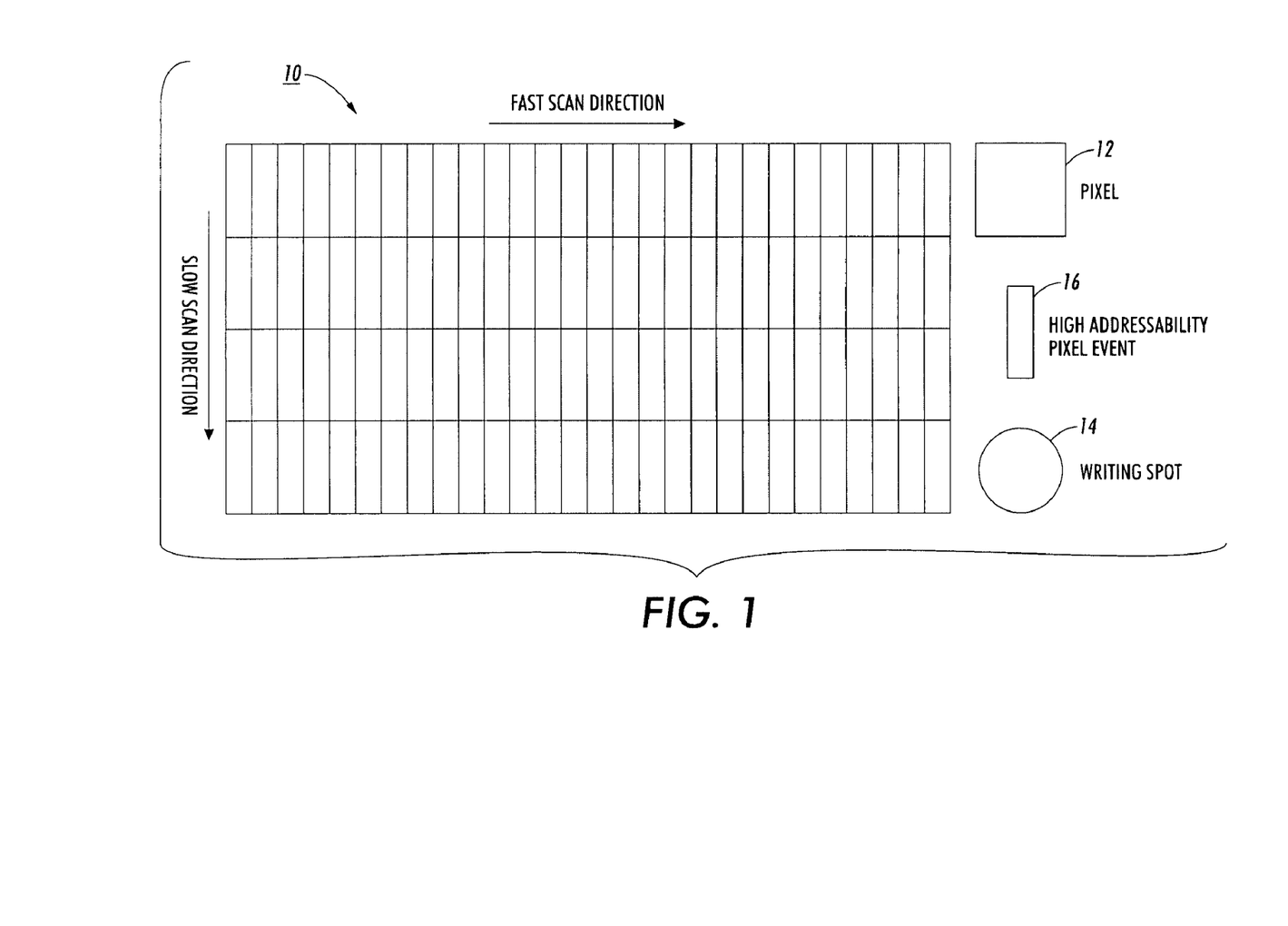
FIG. 1 is a schematic illustration of an exemplary embodiment of a high addressability pixel grid.

Illustratively, FIG. 1 is a diagram showing schematic representation of a high addressability image 10. FIG. 1 further shows the size of an exemplary pixel 12 as well as the size of a writing spot 14. As shown in FIG. 1, each pixel 12 within the image 10 is a high addressability pixel having an addressability resolution in one dimension and comprising four high addressability pixel events or units 16 (e.g., a 4-times-high addressable, fast scan resolution). The circle is representative of the scanning spot, and represents a light intensity distribution having a Gaussian profile.

As pointed out in the 396 patent, multi-level halftones can be generated in a digital front end (DFE) in any of a number of ways. For example, in a digital front end, multi-level halftoning can be performed using commonly available gray screening software, such as is generally available from Adobe®. Alternatively, the multi-level halftoning could be implemented in a hardware halftoner (not shown) coupled between a digital front end and rendering processor performing a hyperacuity function-based screening, such as that described in U.S. Pat. Nos. 5,410,414 and 5,937,109, each incorporated herein by reference in its entirety. Yet another possibility for generating multi-level halftones is the use of multi-level threshold arrays in a software or hardware implementation.

In one exemplary embodiment of the systems and methods according to this invention, an irrational halftoner may be used to convert the resampled information from the image into a binary map. An irrational halftoner includes a halftoner memory, which stores pre-generated halftone cells, which represent intensity information (for example, 256 values), as well as integer screen positions for each cell. For example, a halftone cell may be formed of 8×8 or 32×32 memory locations. The intensity and screen position values are used to address the halftoner memory. A high-addressability multi-bit output is retrieved from the halftoner memory and is used to drive a grayscale modulator 400.

Halftoning printers may include a halftoner memory and a modulator driver. The halftoner memory is generated based on a predetermined halftone dot pattern and is addressed by an intensity value and an integer portion of an irrational screen position. The memory outputs halftoned multi-bit data corresponding to the addressed location. The modulator driver converts the halftoned multi-bit data into corresponding signals used to drive a laser diode. As a result, a mark is rendered corresponding to the multi-bit value at selected fast scan and slow scan positions.

In certain printers, an address accumulator generates a plurality of screen positions in a selected halftone frequency at a selected halftone angle. Each screen position includes an integer component and a fractional component. A resampling interpolator determines an intensity value for each screen position. The halftoner memory stores a predetermined halftone dot function that comprises a plurality of halftone dot planes. Each halftone dot plane represents a dot intensity, for example, 0 through 255. The halftoner memory is addressed by the integer component of the screen position and the determined intensity value for the screen position. One such halftoner is disclosed in U.S. Pat. No. 5,937,109, which is incorporated herein by reference in its entirety.

Figure 2:
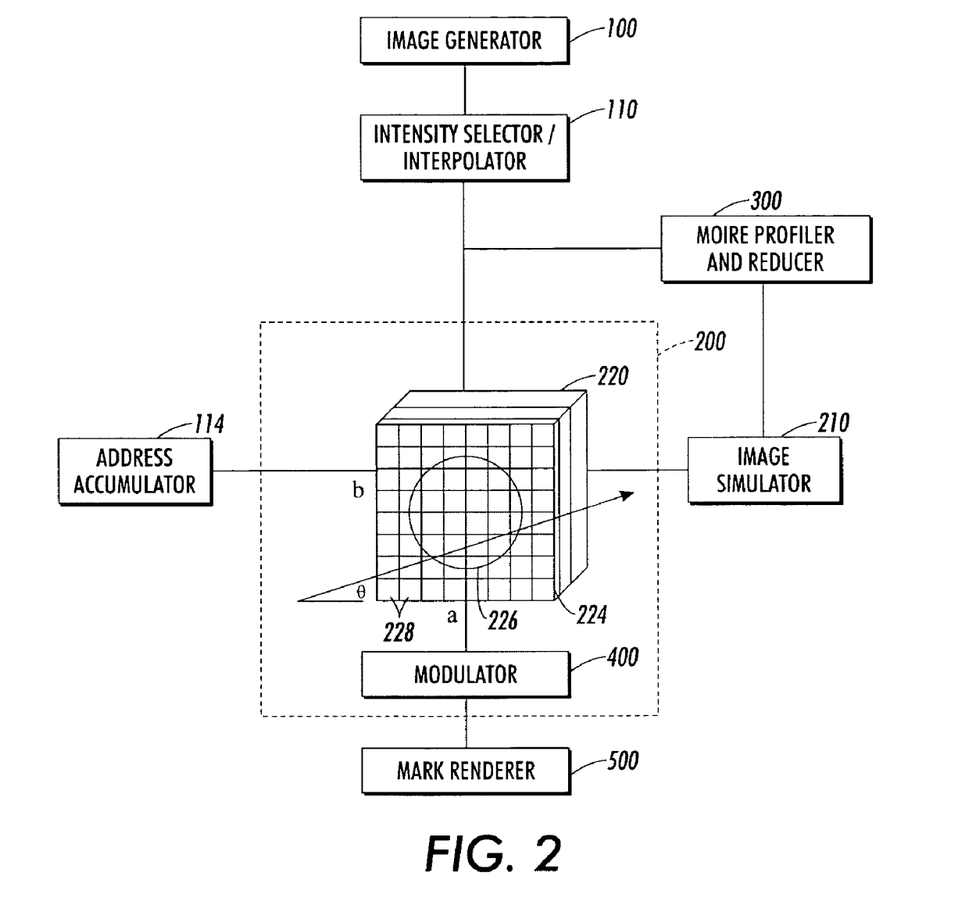
FIG. 2 is one exemplary embodiment of a halftoner suitably usable with the systems and methods of this invention.

As shown in FIG. 2, image data to be rendered is obtained by a halftone image data generator 100 from an image data source 200. An intensity determiner 110 determines the intensity or grayscale value of each pixel by, for example, by interpolation. An address accumulator 114 traverses the image data in a and b directions by generating (a,b) coordinates in increments based on a selected increment frequency and a selected increment angle. Each address designates a screen position (a,b) which has an associated intensity value from the image data that will ultimately be rendered as a mark. The a coordinate is parallel to the light beam fast scan direction and the b coordinate is parallel to the light beam slow scan direction when the halftone angle equals zero.

The address information corresponds to the position of the light beam in the a,b plane. The a and b accumulator 114 tracks the trajectory of the light beam in a fast scan direction. The trajectory, however, moves through the memory at a screen angle which is, for example, 30 degrees. The a and b accumulator increments fractionally so that irrational screen positions are generated. The screen position (a,b) is sent to a halftoner 200.

The halftoner 200 includes a halftoner memory 220 which is addressed by a plurality of intensity values. Each intensity value is represented by one halftone dot plane 224. In an 8-bit intensity example, the halftoner memory stores 256 intensity values, i.e., 256 halftone dot planes 224. Each halftone dot plane 224 contains a halftone dot 226 defined by a dot shape and a dot size, which are determined from a pre-generated halftone dot function. The halftone dot function is typically generated based on the specific physical characteristics of the printing system, such as the mark renderer 500, for which the halftoner 200 is used.

Each halftone dot plane 224 includes a plurality of memory locations 228, for example, in an 8×8 or 32×32 grid, as noted above. Each memory location 228 represents a pixel 12 which is addressed by the screen position (a,b). Each pixel 12 is made up of, for example, 4 high addressability units 16. Each address in the halftoner memory 220 includes three values, one for the a dimension, one for the b dimension, and one for the intensity dimension. These addresses are provided by the a address accumulator, the b address accumulator, and the gray scale data value. The binary gray level values generated by the halftoner 200 are used to control the mark renderer 500, such as a printer.

The moiré profiler and reducer 300, is used to repeatedly sample an image of constant intensity simulated by halftoner 200 to reduce or eliminate the moiré produced by the simulation process. For this purpose, moiré is defined as any difference in the average number of addressability units measured in certain parts of the image called zones, compared with the average number of addressability units produced in all the image zones combined. The moiré profiler and reducer 300 defines "full field" moiré phase zones for the simulated image, and corresponding "folded field" moiré phase zones for the halftoner dot function stored in the halftoner memory 220. Moiré found in the simulated image in a particular full field zone will be reduced or eliminated during iteration by adjusting the halftoner dot function in the corresponding folded field zone in halftoner memory 220. This process is repeated until a desirably reduced moiré image is produced for this intensity. Then this process is repeated for all intensities, for instance, 0 through 255. The halftoner output is used to drive a modulator 400 such as a digital-to-analog converter or a pulse width modulator or a shift register. The modulator 400 generates control signals that are usable to drive an element of the mark renderer 500 such as, for example, a laser diode.

A two dimensional full field moiré intensity distribution function, $I_{ME}$, may be obtained as:

$$I_{ME}(a, b) = \cos\left[2\pi \frac{r}{R}(a \cdot \cos(\theta + \phi) + b \cdot \sin(\theta + \phi))\right] \quad (1)$$

where:

a and b are the image halftone cell address coordinates (see the '414 patent discussed above) as obtained from the accumulators that keep track of halftone dot locations, including both the integer and fractional portion of the halftone dot number;

r is moiré frequency;

R is the halftone frequency $\theta$ is moiré angle; and $\phi$ is the halftone angle.

The full field moiré intensity distribution function $I_{ME}$ gives access to the memory locations in an image and permit a determination of what moiré phase angle zone those memory locations are in for the image and in the halftoner memory locations corresponding to those image memory locations. Moiré intensity functions determine, for each moiré phase angle zone, the average number of high addressability units per halftoner memory location that are in that moiré phase angle zone. For example, using the full field moiré intensity function $I_{ME}$, a determination may be made that, in a reference zone, such as, for example, a first zone, which is, for example, zone 1 of 12 zones, 2.3 out of 4 possible high addressability units are addressed.

The full field moiré intensity distribution function $I_{ME}$ not only gives the position of the moire, but, looking at the zero crossings, the moire intensity distribution function indicates the location of the moire phase angle zones.

There are two moiré intensity distribution functions that predict this moiré intensity distribution. The previously discussed moiré intensity distribution function, called the full-field moiré intensity distribution function, is expressed in terms of a full-field equation. The other moiré intensity distribution function, called the folded-field moiré intensity distribution function, uses the small changes in phase among the sample sets, instead of the absolute full-field coordinates that are used in the full-field equation. The full field moiré intensity function $I_{ME}$ is set forth in Eq. (1), above.

The folded field intensity function $I_F$ is:

$$I_F = \cos(2\pi(k_3 \cdot a - k_4 \cdot b)) \quad (2)$$

where:

a and b are the fractional portion of the image halftone cell address coordinates used in the full field equation above; and $k_3$ and $k_4$ are halftone harmonics.

The halftone harmonic $k_3$ is associated with halftone dot grid X, discussed below in Table 1. The halftone harmonic $k_4$ is associated with halftone dot grid Y, discussed below in Table 1.

Figure 3:
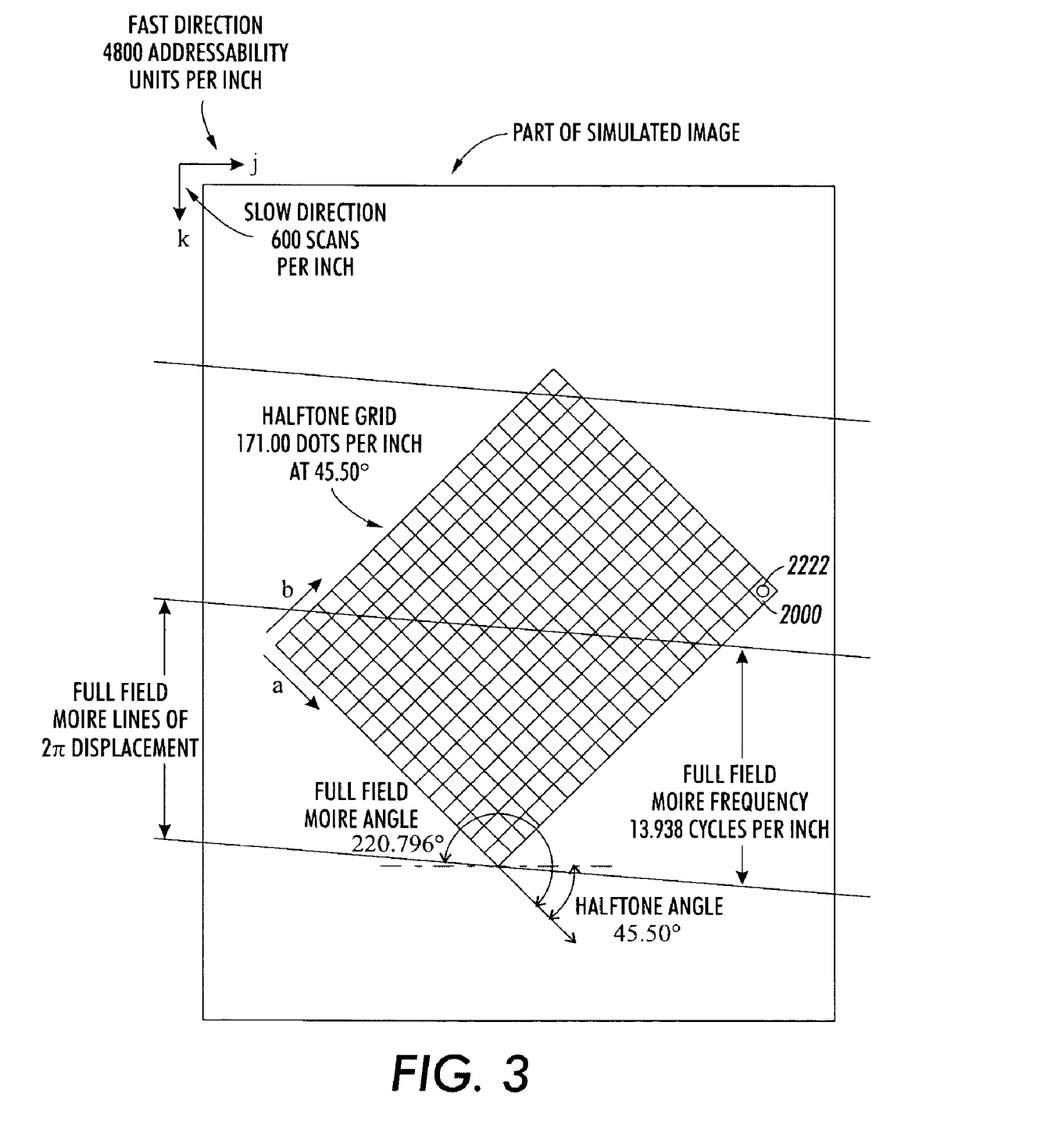
FIG. 3 shows a portion of a halftoner memory simulated image overlaid with a halftone grid.

FIG. 3 shows part of an image simulated by halftoner 200. In this exemplary embodiment of the systems and methods of this invention, a halftone grid having 171.00 dots per inch and a halftone angle of 45.50 degrees is superimposed. The simulated image shows a full field moire frequency of 13.938 cycles per inch defined by full field moire lines of $2\pi$ displacement. The full field moire angle is shown as 220.796 degrees. The Fast scan direction j has 4800 addressability units per inch, and the slowscan direction k has 600 scans per inch. Also illustrated is an exemplary halftone dot 2222 inside of halftone cell 2000. The addressability coordinates a and b are also shown. Incorporated U.S. Pat. No. 5,410,414 discloses how to calculate values for a halftone look-up table.

Figure 4:
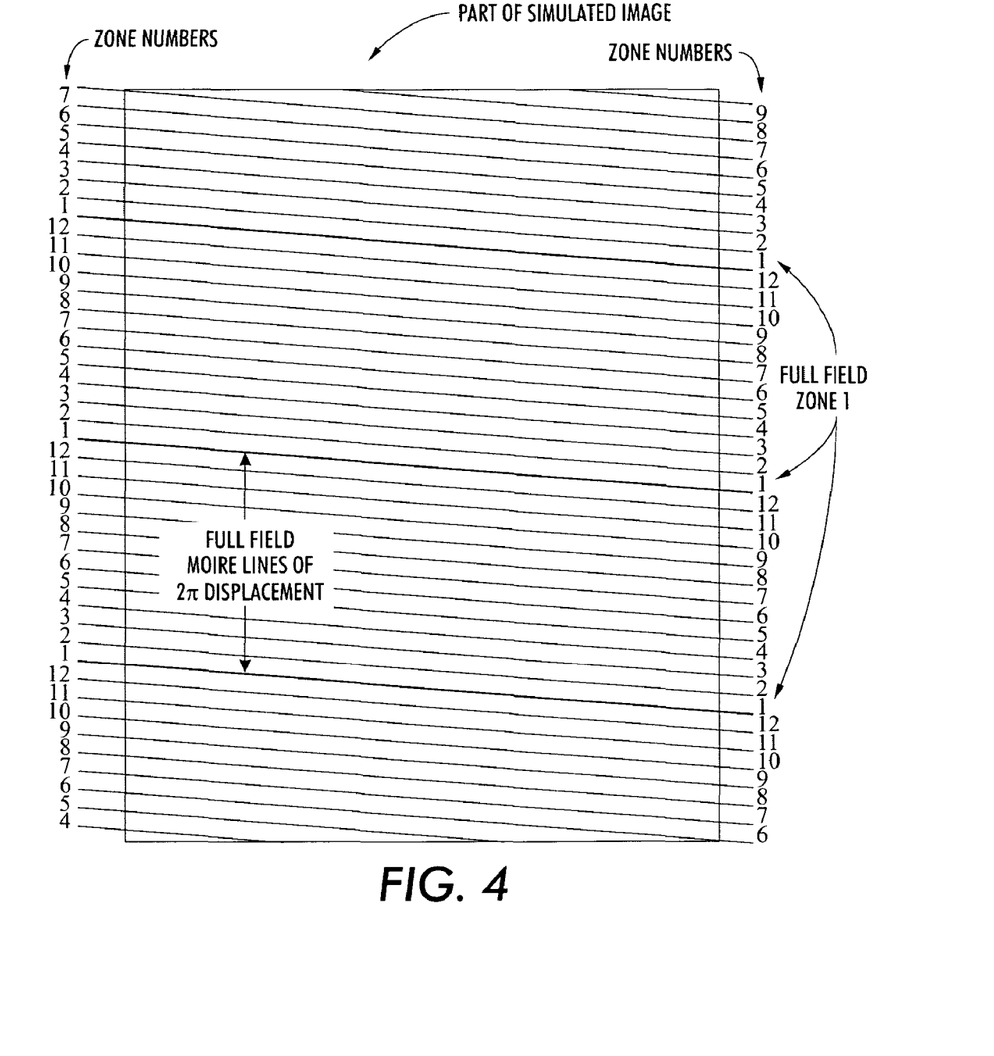
FIG. 4 shows the same portion of a halftoner memory simulated image shown in FIG. 3 overlaid with moire phase angle zone lines.

FIG. 4 shows the same part of the simulated image shown in FIG. 3, emphasizing the n=12 moire phase angle zones into which each full field moire lines of $27\pi$ displacement have been divided. As noted above, n can vary significantly, and n=12 is only one exemplary embodiment used for illustration.

Figure 5:
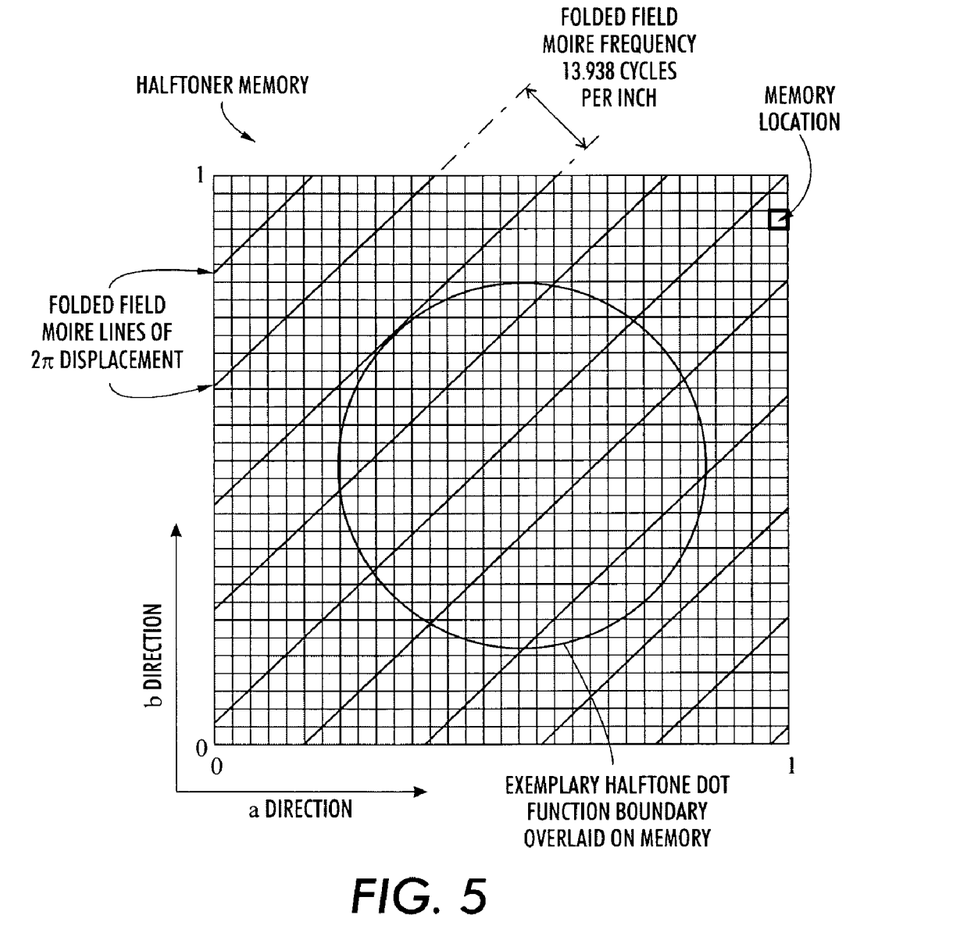
FIG. 5 shows a halftone memory with folded field moire lines of $2\pi$ displacement and an exemplary halftone dot function boundary overlaid on the halftone memory.

FIG. 5 shows a halftone memory with folded field moire lines of $27\pi$ displacement and an exemplary halftone dot function boundary overlaid on the halftone memory.

Figure 6:
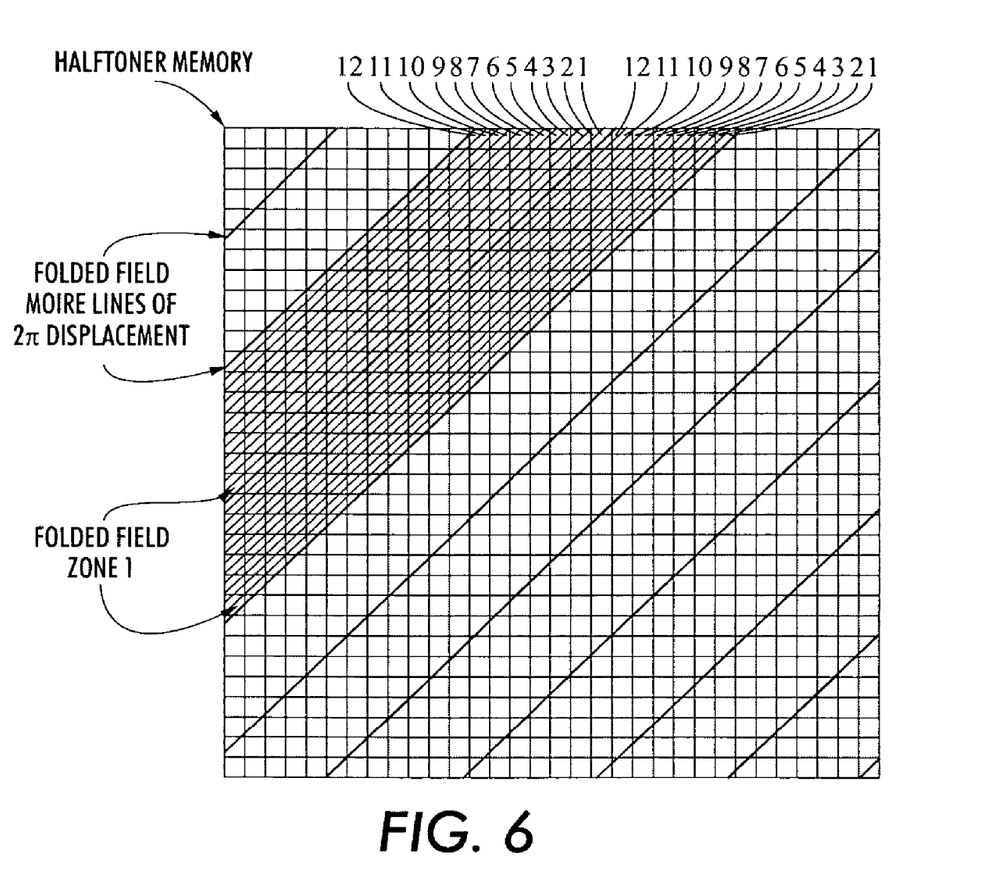
FIG. 6 shows the halftone memory of FIG. 5 with folded field moire lines of $2\pi$ displacement, including a number of displacement zones between some of the lines of $2\pi$ displacement.

FIG. 6 shows the halftone memory of FIG. 5 with folded field moire lines of displacement, including a number of displacement zones between some of the lines of $2\pi$ displacement. Only two of the plurality of folded field moire lines of $2\pi$ displacement shown in FIG. 5 are shown divided into n=12 moire phase angle zones to keep the figure from becoming too cluttered, but it is understood that all of the folded field moire lines of $2\pi$ displacement are divided into n=12 moire phase angle zones. These zones are determined in the following manner. First, one uses equations (1) and (2), set forth above, to subdivide the full field and the folded into corresponding zones. Note that both of the aforementioned functions (expressed in terms of equations (1) and (2)) are derived by taking a cosine of a 2-d functional value, resulting in a co-sinusoidal corrugation. To make zones of equal spacing, the cosine corrugation is replaced with a sawtooth corrugation repeating every $2\Pi$ (using the modulus function) just as in a cosine case. However, the sawtooth function is linear, and the result, when normalized over the desired number of zones, is a series of zone boundaries within each $2\Pi$ period with linear spacing.

For the full field function, the zone number $Z_{ME}$ may be found by:

$$Z_{ME}(a, b) = \frac{mod\left[\left(2\pi \frac{r}{R}(a \cdot \cos(\theta + \phi) + b \cdot \sin(\theta + \phi))\right), 2\pi\right]}{2\pi} \cdot n \quad (3)$$

where n is the number of zones. Taking the modulus of the first argument (the first argument being the expression in the numerator within parenthesis before ",$2\pi$") results in a number between 0 and $2\Pi$, and multiplying by n over $2\Pi$ results in a zone number between 0 and the number of zones.

For the folded field function, the zone number $Z_F$ is found by:

$$Z_F = \frac{mod[(2\pi(k_3 \cdot a - k_4 \cdot b)), 2\pi]}{2\pi} \cdot n \quad (4)$$

where n is the number of zones. Taking the modulus (in the sense of the base of a number system) of the first argument (the first argument being the expression in the numerator within parenthesis before ",$2\pi$") results in a number (remainder) between 0 and $2\Pi$, and multiplying by n over $2\Pi$ results in a zone number between 0 and the number of zones. Any a,b can be mapped into a particular zone in the full field and the folded field.

Figure 7:
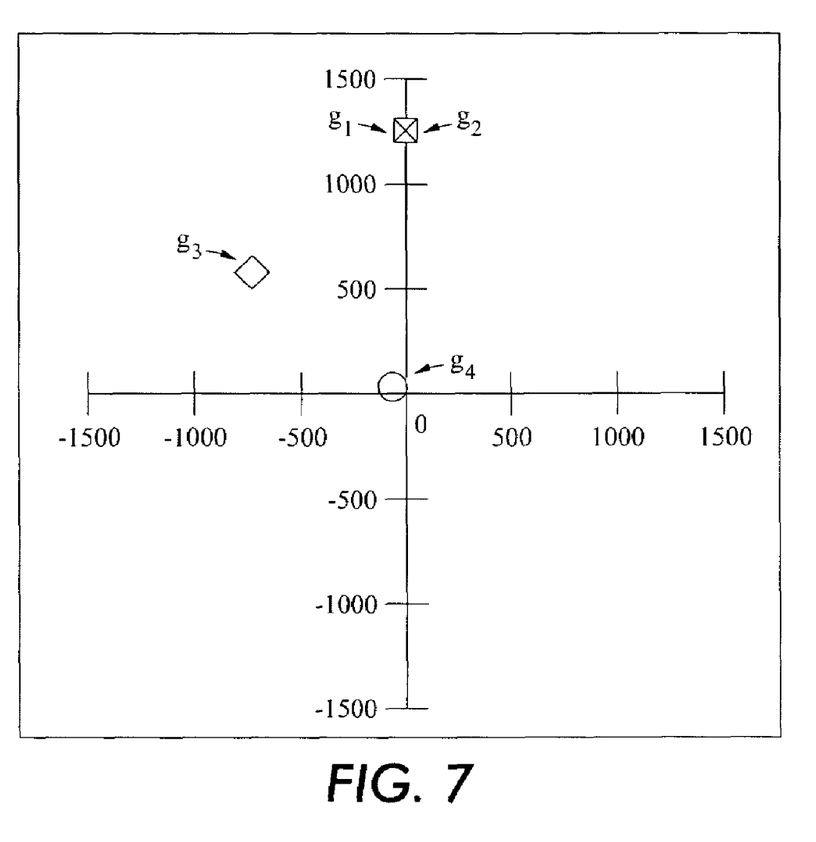
FIG. 7 is a graph of characteristics of spectrum vectors for a particular dot screen.

The halftone harmonics used in the aforenoted exemplary embodiment of the systems and methods according to this invention were chosen using a spectrum vector frequency graph as shown in FIG. 7. Generating halftones, using for example, a raster output scanner, involves a number of vectors, including a scan vector, a clock vector, a halftone vector x and a halftone vector y. The vector $g_1$ is the product of the scan vector $f_1$ and its harmonic $k_1$. The vector $g_2$ is the sum of $g_1$ and the product of the clock vector $f_2$ and its harmonic $k_2$. The vector $g_3$ is the sum of $g_2$ and the product of halftone vector $f_3$ and its harmonic $k_3$. The vector $g_4$ is the sum of the products of scan plus clock plus halftone vectors x and y with their respective harmonics. By selecting the harmonics as shown, below, i.e., $k_1=2$; $k_2=0$; $k_3=-5$; and $k_4=-5$, one obtains a plot of moire frequency space. We are interested in those vector points landing that land near, but not at the origin, because those landing points represent have the lowest frequencies (other than the origin, which represents dc, and cannot be seen by a human) and represent the maximum moire which will be observed in an image generated by the halftoner.

In various exemplary embodiments of the systems and methods according to this invention, four separate vectors are employed in determining the full field moiré intensity function. The first vector $f_1$, the scan vector, is:

$$f_1 = \begin{pmatrix} 0 \\ d_p \end{pmatrix} * \quad (5)$$

The second vector $f_2$, the clock vector, is:

$$f_2 = \begin{pmatrix} AF \\ g_2 \\ 0 \end{pmatrix} \quad (6)$$

The third vector $f_3$, the halftone vector in the x direction, is:

$$f_3 = R \cdot \begin{pmatrix} \cos(\frac{\pi}{2} - \phi) \\ \sin(\frac{\pi}{2} - \phi) \end{pmatrix}$$

where R is the halftone frequency.

The last vector $f_4$, the halftone vector in the y direction, is:

$$f_4 = R \cdot \begin{pmatrix} \cos(\pi - \phi) \\ \sin(\pi - \phi) \end{pmatrix} \quad (7)$$

The resultant moiré intensity $g_n$ is the sum of the products of the scan vector $f_1$, the clock vector $f_2$ and the halftone vectors $f_3$ and $f_4$, multiplied by their respective harmonics (k). That is, the resultant moiré intensity $g_n$ is:

$$g_n = \overline{(k_1 f_1 + k_2 f_2 + k_3 f_3 + k_4 f_4)} \quad (8)$$

where $g_1$ is the vector product of the scan vector $f_1$, and its harmonics $k_1$, and is defined as $$g_1 = \overline{(k_1 f_1)} \quad (9)$$

$g_2$ is the vector sum of $g_1$ and the vector product of the clock vector $f_2$ and its harmonics $k_2$ and is defined as $$g_2 = \overline{(k_1 f_1 + k_2 f_2)}; \text{ and} \quad (10)$$

$g_3$ is the vector sum of $g_1$ and $g_2$ and the vector product of the halftone vector $f_3$ and its harmonics $k_3$ and is defined as $$g_3 = \overline{(k_1 f_1 + k_2 f_2 + k_3 f_3)} \quad (11)$$

In other words, the resultant moiré intensity $g_n$ is the sum of the products of scan plus clock plus halftone vectors with their respective harmonics, i.e., the resultant moiré vector.

Table 1 lists characteristics of the spectrum vectors for a particular dot screen.

TABLE 1

| Frequency | Angle | Harmonic | Description | Graph Symbol |
|---|---|---|---|---|
| freq($f_1$) = 600 | ∠($f_1$) = 90°. | $k_1$ = 2 | Scan Frequency | □ |
| freq($f_2$) = 1200 | ∠($f_2$) = 0°. | $k_2$ = 0 | Clock Rate | X |
| freq($f_3$) = 171 | ∠($f_3$) = 0.777°. | $k_3$ = −5 | Halftone Dot Grid X | ◊ |
| freq($f_4$) = 171 | ∠($f_4$) = 2.347°. | $k_4$ = −5 | Halftone Dot Grid Y | ○ |

This is illustrated in FIG. 7. In this example, the resultant moiré intensity vector $g_n$ is determined to be $$g_n = \begin{pmatrix} -10.522 \\ -9.107 \end{pmatrix}$$

where:
the moiré frequency, r, is 13.938
the moiré angle, θ, is 220.796°;
the halftone frequency, R, is 171;
the halftone angle, φ, is 45.5°; and
the halftone phase, ρ, is 0.

In the aforementioned exemplary embodiment of the systems and methods of this invention, the harmonic values, i.e., the k values, have been found by trial and error to sum to a value near the origin, shown in FIG. 7. If a vector point lands directly on the origin or too close, the moire value is low frequency, and will normally be too low for the eye to perceive in the printed document. If the sum (i.e., the vector point sum of the harmonic vectors) lands too far away from the origin, the frequency will normally be too high for the eye to perceive in the printed document. Normally, in the range of perhaps from about 0.1 cycles per inch to about 100 cycles per inch will the moire frequency be such that the eye will notice the moiré and see it as objectionable, although the exact frequency range may be somewhat larger. The technique for adding vectors with various k harmonics in moire frequency space is a well-known technique in the printing industry, and is explained in detail in various books on the subject of moiré or halftoning. See for example, "The Theory of the Moire Phenomenon" by Isaac Amidror, Kluwer Academic Publishers, Chapter 2. In the exemplary embodiment illustrated in FIG. 7, we have found objectionable moire of 13.938 cycles per inch by using the k values 2,0,−5,−5, as in the above table. Other objectionable moire frequencies and angles may be found using other harmonic (k) values. In other words, in a given image, the overall moire profile may be made up of a number of component moire profiles at different frequencies. Any and all objectionable component moire profiles at different frequencies and angles may be reduced and/or eliminated or canceled according to the systems and methods according to this invention, simultaneously, in the context of modifying an overall moire profile with a single halftoner with additional computations using a number of different k values in the full field and/or folded field equations set forth above.

Figure 8:
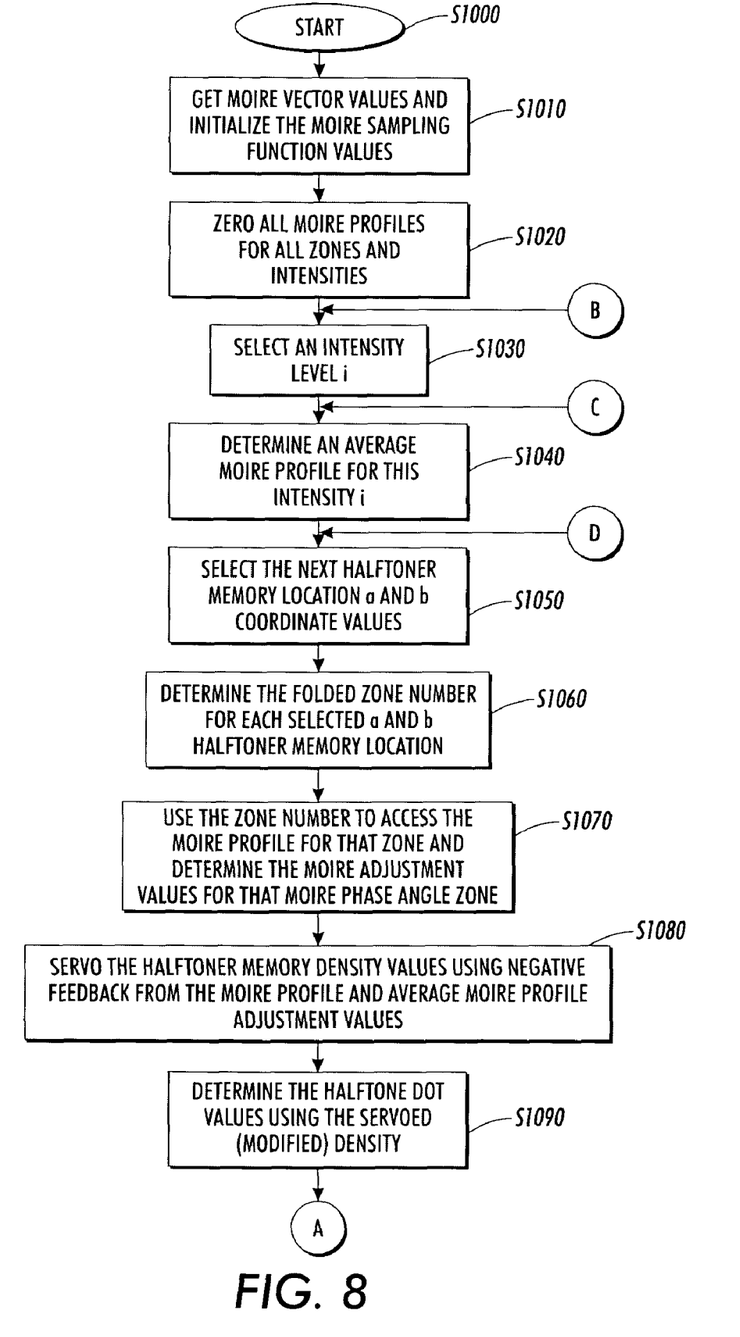
FIGS. 8 through 10 illustrate a flowchart outlining one exemplary embodiment of a process for computationally canceling moire according to this invention.
Figure 9:
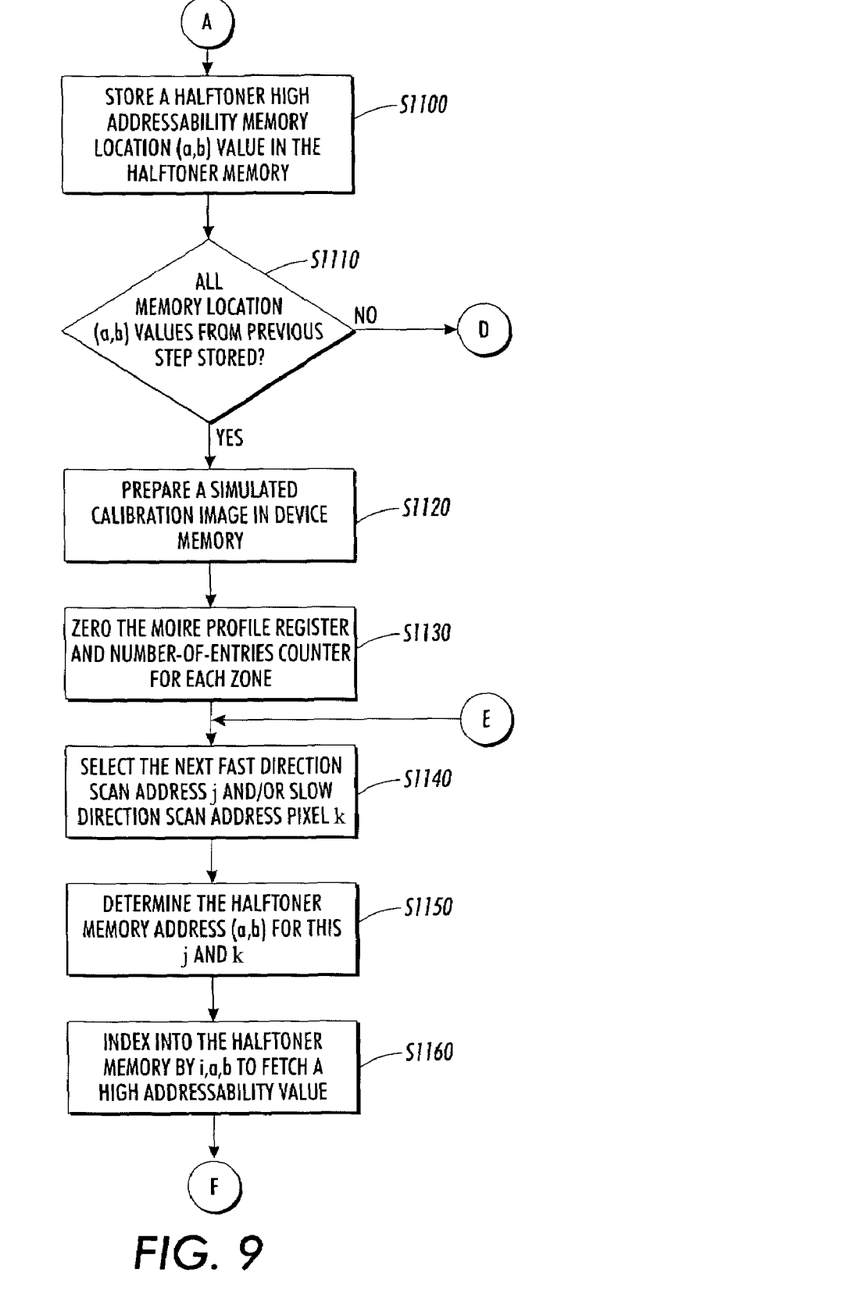
Figure 10:
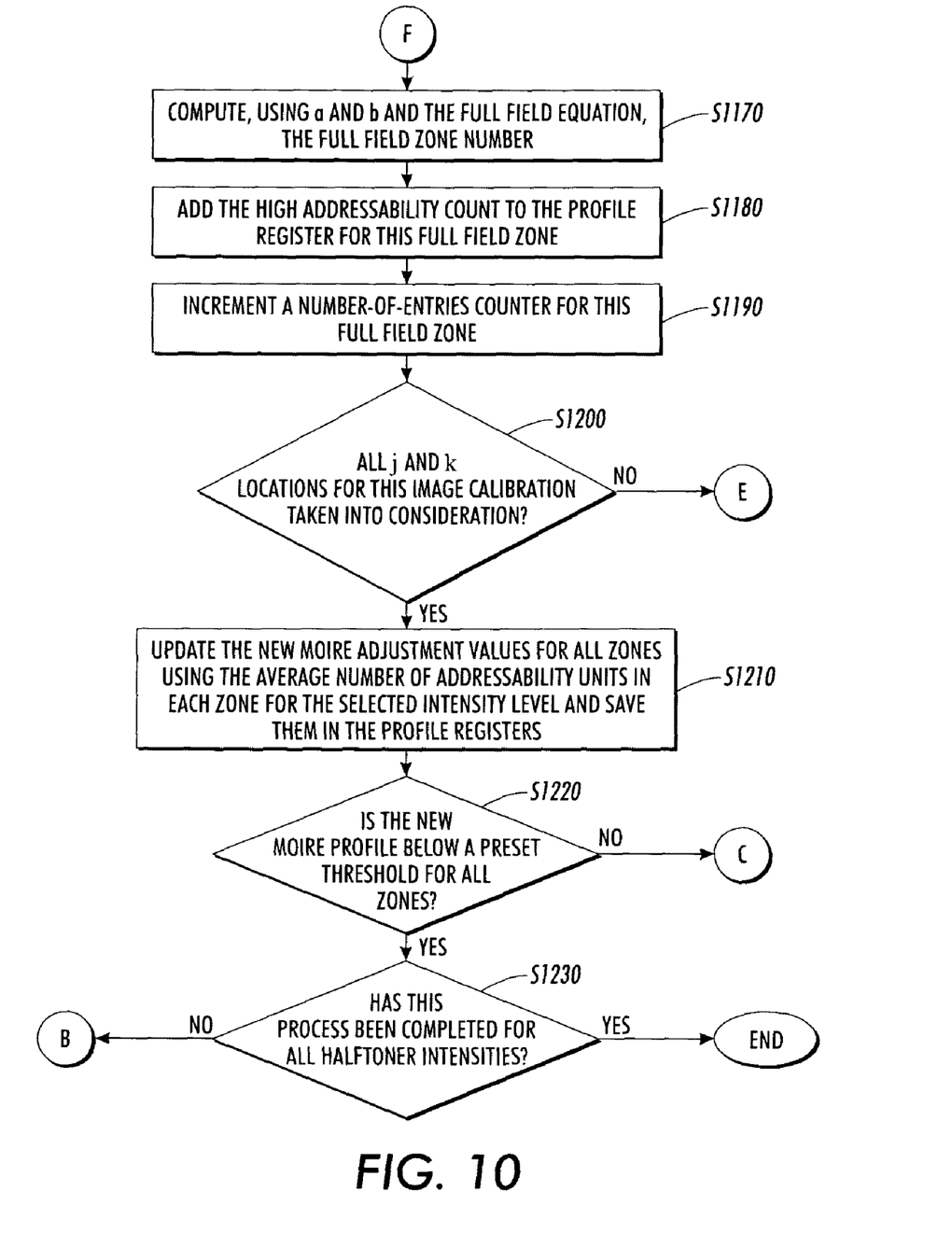

One exemplary embodiment of a method according to this invention is outlined in the flowchart of FIGS. 8-10. Control starts in step S1000 and proceeds to step S1010, where the moire vector sum which lands nearest the origin without actually hitting the origin is found, the moire sampling functions values are obtained, and the moire phase angles are divided into zones for a number of intensity levels in the halftoner 200. For example a complete 360° cycle of moire phase angles may be divided into 12 zones of 30° each of moire phase angle. Other parameters which are used in determining this moiré profile are the halftone screen frequency, the halftone screen angle φ, the halftone screen phase ρ, the number of grayscale levels $g_1$, the number of addressability units in the halftone $A_f$, the number of facets per inch or the number of halftone dots per inch dp, and the modulus m, which is the number of bits used for a and y addressing in a halftone screen cell.

Next, control proceeds to step S1020 where all moire profiles for all zones and intensities are initialized to zero. During iteration for a specific intensity, the n moire profiles for that intensity are updated after each loop, and are intended to store the final result for the best profile to cancel the target moire.

Control then proceeds to step S1030, where a particular image intensity level i is selected (where i=0 to 255, for example). Next, in step S1040, an average moire profile is determined for this intensity i. Next, in step S1050, the next halftoner memory location coordinate locations a and b are selected. Next, in step S1060, a folded-field equation zone number is determined for this addressability location, a, b.

Next, in step S1070, the zone number is used to access the moire profile for that zone. Reference is made in this regard to FIGS. 4 and 6, which clearly illustrate that each moire phase angle zone, such as, for example, zone n=1, occurs in each of the plurality of zones of 2π moire lines of displacement found in a given image or image portion. Then control proceeds to step S1080 where the halftone density is modified or servoed in the halftoner memory using negative feedback from the moire profile and the average moire profile. In one exemplary embodiment, a negative feedback formula comprises adjusting the halftoner's density for that zone by a fraction of the current moire profile and the average profile. By using the average profile in the adjustment process, the convergence caused by the servoing is made more stable than it would be without the average profile.

Next, in step S1090, a determination is made of the halftone dot high addressability value using the servoed (modified) density. Then, in step S1100, the high addressability values for the desired halftone dot are stored in the halftoner memory at address a,b. Next, in step 1110, a determination is made whether values for all halftoner memory location addresses for the given halftoner intensity value have been stored. If not, control returns to step S1050. Otherwise, control proceeds to step S1120

In step S1120, a simulated image is generated in computer memory, e.g., general computer memory, based on the modified (servoed) halftoner memory data. That image may, optionally, be printed and viewed to determine what moire intensity reduction appears to have occurred.

Next, in step S1130, temporary moire profile registers and number-of-entries counter are zeroed for each of the zones. (Temporary registers may be used to store the profile during the looping process while making the simulated image. The results of the process, i.e., the halftone dot values for all high addressability memory locations (a,b), are transferred to the profile registers for each particular intensity upon completion of this loop.(steps S1050 through step S1110—No). Then, in step S1140, the next fastscan j and pixel k is obtained, and the halftone positions a and b for this j and k are determined in step S1150. Next, in step S1160, the halftoner memory is indexed to fetch the high addressability unit (pixel event) count for this value of i, a, b. Then, in step 1170, the full field zone number is computed using the fractional portion of a,b and the full field equation. Next, in step S1180, the high addressability unit (pixel event) count is added to the moire intensity profile register for this moire phase angle zone, and a number-of-entries counter for this zone is incremented in step S1190.

Next, in step S1200, a determination is made whether this process has been completed for all addressability units in the fastscan and slowscan directions. If not, control returns to step S1050 to get the next scan j and/or pixel k and repeats the process. If so, control proceeds to step S1210 to update new moire adjustment values (which constitute an inverse moire profile) for all zones using the average number of addressability units in each zone for the particular intensity and transfer them to the profile registers for this intensity.

Next, in step S1220, a determination is made whether the adjusted moire intensity profile is below a preset threshold (i.e., is acceptable) for all zones. In one exemplary embodiment of the systems and methods according to the invention, this threshold is determined by computer analysis of a simulated halftoner image based on the moire adjustments made using the methods described herein. In another exemplary embodiment, the threshold is determined visually based on a video image or a print image based on the moire adjustments made using the methods described herein. However, any known or later developed quantitative method of evaluating moire may be used to determine one or more moire acceptability thresholds. If not, control returns to step S1040 and the process repeats. If so, control proceeds to step S1230 to determine whether the moire profile adjustment process described above has been conducted for all intensity levels. If not, control returns to step S1030 to select another intensity i from 0 to 255. If so, control proceeds to step S1240 where the process ends.

Once the moiréintensity level has been compensated/reduced, there are a number of ways to determine the effectiveness of the moiré reduction. One method is to rely on the halftoner memory readout, as indicated above. Another is to make and review one or more output images made using the moiré compensation process.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for minimizing moiré in a halftoned image formed using a halftoner, comprising:
    determining moiré zones in a full field of the image;
    determining moiré amplitude for the full field of the image and a folded field of a halftoner memory;
    comparing full field moiré phase angle zones to moiré phase angle zones in the folded field of the halftoner memory;
    adjusting high addressability units of the halftoner memory to reduce a moiré intensity profile of the image on a halftone cell basis based on the comparing, wherein the reduced moiré intensity profile is below a threshold, and thus moiré is minimized; and
    modulating a light beam to generate an output image having the minimized moiré.

2. The method of claim 1, further comprising determining an average moiré profile for a given image intensity in at least one moiré zone.

3. The method of claim 1, further comprising generating an inverse moiré profile.

4. The method of claim 1, wherein the moiré profile includes a plurality of component moiré profiles at different frequencies.

5. The method of claim 4, wherein the frequencies are in a range from about 0.1 cycles per inch to about 100 cycles per inch.

6. The method of claim 1, further comprising zeroing the moiré profile in all zones for a given image intensity level.

7. The method of claim 1, further comprising zeroing the moiré profile in all zones for a predetermined number of image intensity levels.

8. The method of claim 1, wherein the high addressability units determine moiré adjustment values which are based on a folded zone equation.

9. The method of claim 1, wherein adjusting the high addressability units comprises repeated adjusting.

10. The method of claim 1, further comprising storing results of the adjusting in the halftoner.

11. The method of claim 1, wherein determining the moiré zones in the full field of the image comprises using a full-field moiré intensity function.

12. The method of claim 10, further comprising defining a moiré intensity function as having at least one sinusoidal component.

13. The method of claim 1, wherein the moiré is due to use of irrational halftone dots.

14. The method of claim 1, further comprising determining at least one of a frequency and an angle of the moiré.

15. The method of claim 13, further comprising determining an intensity of the moiré as a function of a halftoner addressability unit.

16. The method of claim 1, further comprising outputting halftone images.

17. The method of claim 16, further comprising determining which output image has a lowest observable moiré.

18. An image forming device having a halftoner memory usable to minimize moiré in a halftone image containing halftone cells, comprising:
- a moiré phase angle zone determiner that determines moiré amplitude for a full field of the image and a folded field of a halftoner memory;
- a comparator that compares the full field moiré phase angle zones to moiré phase angle zones in the folded field of the halftoner memory;
- an adjustor that adjusts high addressability units of the halftoner memory to reduce a moiré intensity profile of the image on a halftone cell basis, wherein the reduced moiré intensity profile is below a threshold, and thus moiré is minimized; and
- a modulator that modulates a light beam to generate an output image having the minimized moiré.

19. The image forming device of claim 18, wherein the moiré intensity profile is determined using a full-field function.

20. The image forming device of claim 18, wherein the moiré intensity profile is determined using a folded field function.

21. The image forming device of claim 18, further comprising at least one of a moiré frequency determiner and a moiré angle determiner.

22. The image forming device of claim 18, wherein the moiré intensity profile is determined as a function of a halftoner addressability unit.

23. The image forming device of claim 18, further comprising a determiner that determines which amplitude and phase result in an output image having a minimized observable moiré.

24. The image forming device of claim 18, wherein the moiré phase angle zone determiner operates within a two-dimensional halftone coordinate system.

25. A device having a halftoner memory usable to minimize moiré in a halftone image containing halftone cells, comprising:
- a moiré phase angle zone determiner that determines moiré amplitude for a full field of the image and a folded field of a halftoner memory;
- a comparator that compares the full field moiré phase angle zones to moiré phase angle zones in the folded field of the halftoner memory;
- an adjustor that adjusts high addressability units of the halftoner memory to reduce a moiré intensity profile of the image on a halftone cell basis, wherein the reduced moiré intensity profile is below a threshold, and thus moiré is minimized; and
- a halftoner memory that provides an indication of the minimized moiré image.

26. The device of claim 25, wherein the image forming device is a hyper acuity image forming device.

* * * * *